(12) United States Patent
Davis et al.

(10) Patent No.: US 10,157,279 B2
(45) Date of Patent: Dec. 18, 2018

(54) MALWARE DETECTION

(71) Applicant: Cylance Inc., Irvine, CA (US)

(72) Inventors: Andrew Davis, Portland, OR (US);
Matthew Wolff, Newport Beach, CA (US); Derek A. Soeder, Irvine, CA (US); Glenn Chisholm, Irvine, CA (US); Ryan Permeh, Irvine, CA (US)

(73) Assignee: Cylance Inc., Irvine, CA (US)

( * ) Notice: Subject to any disclaimer, the term of this patent is extended or adjusted under 35 U.S.C. 154(b) by 215 days.

(21) Appl. No.: 15/210,761

(22) Filed: Jul. 14, 2016

(65) Prior Publication Data

US 2017/0017793 A1 Jan. 19, 2017

Related U.S. Application Data

(60) Provisional application No. 62/193,025, filed on Jul. 15, 2015.

(51) Int. Cl.
*G06F 21/56* (2013.01)
*G06N 3/08* (2006.01)

(52) U.S. Cl.
CPC .......... *G06F 21/565* (2013.01); *G06F 21/562* (2013.01); *G06N 3/08* (2013.01); *G06F 2221/034* (2013.01)

(58) Field of Classification Search
None
See application file for complete search history.

(56) References Cited

U.S. PATENT DOCUMENTS

| 8,165,414 B1* | 4/2012 | Yagnik | G06F 17/3002 |
| | | | 382/236 |
| 8,826,439 B1* | 9/2014 | Hu | G06F 21/563 |
| | | | 726/24 |
| 2009/0271865 A1* | 10/2009 | Jiang | H04L 63/1425 |
| | | | 726/23 |
| 2015/0039543 A1* | 2/2015 | Athmanathan | H04L 63/1425 |
| | | | 706/20 |
| 2015/0254555 A1* | 9/2015 | Williams, Jr. | G06N 3/0454 |
| | | | 706/14 |

OTHER PUBLICATIONS

Siddiqui et al., "Data mining methods for malware detection using instruction sequences", Jan. 2008.*

(Continued)

*Primary Examiner* — Henry Tsang
(74) *Attorney, Agent, or Firm* — Jones Day

(57) ABSTRACT

In one respect, there is provided a system for training a neural network adapted for classifying one or more scripts. The system may include at least one processor and at least one memory. The memory may include program code which when executed by the at least one memory provides operations including: receiving a disassembled binary file that includes a plurality of instructions; processing the disassembled binary file with a convolutional neural network configured to detect a presence of one or more sequences of instructions amongst the plurality of instructions and determine a classification for the disassembled binary file based at least in part on the presence of the one or more sequences of instructions; and providing, as an output, the classification of the disassembled binary file. Related computer-implemented methods are also disclosed.

19 Claims, 9 Drawing Sheets

(56) References Cited

OTHER PUBLICATIONS

Santamarta, Ruben. "Generic Detection and Classification of Polymorphic Malware Using Neural Pattern Recognition." www.reversemode.com, Dec. 31, 2006 (Dec. 31, 2006), pp. 1-12. XP055315054.
Siddiqui, Muazzam Ahmed et al. "Data Mining Methods for Malware Detection Using Instruction Sequences." Jan. 31, 2008 (Jan. 31, 2008), pp. 1-8. XP055315045, Retrieved from the Internet Oct. 31, 2016.
Tesauro, G.J. et al. "Neural networks for computer virus recognition." IEEE Expert. vol. 11. No. 4. Aug. 1, 1996 (Aug. 1, 1996), pp. 5-6, XP055314986, ISSN 0885-9000.
Zhang, Yichi et al. "Fuzzy Neural Networkfor Malware Detect." Intelligent System Design and Engineering Application (ISDEA), 2010 International Conference on IEEE, Oct. 13, 2010 (Oct. 13, 2010). pp. 780-783. XP032014446. DOI 10.1109/ISDEA.2010.314. ISBN: 978-1-4244-8333-4.

* cited by examiner

```
mov    -0x1(%rbx),%dl
cmp    $0x20,%dl
jne    3091e
dec    %eax
dec    %rbx
mov    %eax,0x38(%rsp)
jmp    308f8
cmp    $0x9,%dl
```

FIG. 3A

```
mov: 1 0 0 0 0
cmp: 0 1 0 0 0
jne: 0 0 1 0 0
dec: 0 0 0 1 0
jmp: 0 0 0 0 1
```

[mov, cmp, jne]

[cmp, jne, dec]

[jne, dec, dec]

[dec, dec, mov]

[dec, mov, jmp]

[mov, jmp, cmp]

FIG. 3D

```
[mov, cmp, jne]         [1 0 0 0 0  0 1 0 0 0  0 0 1 0 0]
[cmp, jne, dec]         [0 1 0 0 0  0 0 1 0 0  0 0 0 1 0]
[jne, dec, dec]         [0 0 1 0 0  0 0 0 1 0  0 0 0 1 0]
[dec, dec, mov]    X =  [0 0 0 1 0  0 0 0 1 0  1 0 0 0 0]
[dec, mov, jmp]         [0 0 0 1 0  1 0 0 0 0  0 0 0 0 1]
[mov, jmp, cmp]         [1 0 0 0 0  0 0 0 0 1  0 1 0 0 0]
```

MALWARE DETECTION

CROSS REFERENCE TO RELATED APPLICATION

This application claims priority to U.S. Provisional Patent Application No. 62/193,025 filed Jul. 15, 2015, entitled "CONVOLUTIONAL NEURAL NETWORKS FOR MALWARE ANALYSIS," the contents of which is hereby incorporated by reference in its entirety.

TECHNICAL FIELD

The subject matter described herein relates generally to machine learning and more specifically to the use of neural networks in the detection of malware.

BACKGROUND

A computer program is typically compiled to generate an executable program. The compilation process transforms the computer program from source code to object code. While source code is written in a high-level, human-readable programming language (e.g., C, Java), object code is in a binary format that is not immediately comprehensible. Although object code can be transformed into human-readable form in a process known as disassembly, a human operator cannot efficiently and reliability detect malicious computer programs by inspecting the disassembled object code.

SUMMARY

Systems, methods, and articles of manufacture, including computer program products, are provided for training and using a convolutional neural network to detect malware. In some example embodiments, there is provided a system that includes at least one processor and at least one memory including program code which when executed by the at least one memory provides operations. The operations can include receiving a disassembled binary file that includes a plurality of instructions; processing the disassembled binary file with a convolutional neural network configured to detect a presence of one or more sequences of instructions amongst the plurality of instructions and determine a classification for the disassembled binary file based at least in part on the presence of the one or more sequences of instructions; and providing, as an output, the classification of the disassembled binary file.

In some variations, one or more features disclosed herein including the following features can optionally be included in any feasible combination. The plurality of instructions can be variable in length. The system can be further configured to generate fixed length representations of the plurality of instructions by truncating or padding each of the plurality of instructions to a same length. The fixed length representations of the plurality of instructions can include a mnemonic associated with each instruction. In some variations, the system can be further configured encode the fixed length representations of the plurality of instructions, wherein the encoding is based on one-hot encoding or binary encoding.

In some variations, the convolutional neural network can be configured to apply a first plurality of kernels to the disassembled binary file, and wherein each of the first plurality of kernels is adapted to detect a different sequence of two or more instructions. The convolutional neural network can be further configured to apply a second plurality of kernels to the disassembled binary file, and wherein each of the second plurality of kernels is adapted to detect a different sequence of two or more sequences of instructions. Applying the first plurality of kernels can include applying a first weight matrix to a matrix representation of the disassembled binary file, and wherein the matrix representation of the disassembled binary file comprises encoded fixed length representations of the plurality of instructions included in the disassembled binary file.

In some variations, the system can be further configured to train the convolutional neural network by at least: receiving a plurality of training files, wherein the plurality of training files comprises a plurality of disassembled binary files; determining a classification of a first training file by at least processing the first training file with the convolutional neural network; back propagating an error associated with the classification of the first training file; and adjusting at least the first weight matrix to minimize the error associated with the classification of the first training file. The training of the convolutional neural network can further include: determining a classification for a second training file by at least processing the second training file with the convolutional neural network; back propagating an error associated with the classification of the second training file; and readjusting at least the first weight matrix to minimize the error associated with the classification of the second training file.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A depicts an example of an instruction set that can be included in a disassembled binary file;

FIG. 3B depicts an example of mappings that can be used when one-hot encoding is applied to instructions in an instruction set to generate encoded fixed length representations of each instruction;

FIG. 3C depicts an example of encoded fixed length representations of instructions in an instruction set;

FIG. 3D depicts an example of an order in which one or more convolution kernels can be applied to instructions in an instruction set;

FIG. 3E depicts an example of an input matrix representative of a sequence of instructions in a disassembled binary file consistent with implementations of the current subject matter;

FIG. 3F depicts an example of a weight matrix representative of one or more kernels applied at a convolution layer consistent with implementations of the current subject matter;

FIG. 3G depicts an example of a matrix representative of a feature map generated by applying one or more kernels to a sequence of instructions in a disassembled binary file consistent with implementations of the current subject matter;

DETAILED DESCRIPTION

As noted above, malicious executables tend to evade detection due to the difficulties associated with inspecting and analyzing binary files. Thus, in some implementations of the current subject matter, a binary file can be disassembled thereby forming a discernible sequence of instructions having one or more identifying features (e.g., instruction mnemonics). A convolutional neural network (CNN) can be utilized to analyze the disassembled binary file including by applying a plurality of kernels adapted to detect certain sequences of instructions in the disassembled binary file. The convolutional neural network can detect malicious executables by providing a classification of the disassembled binary file (e.g., as malicious or benign).

The instructions in a disassembled binary file can be variable in length. For instance, instructions used in the x86 architecture are commonly less than 8 bytes in length but can be as long as 15 bytes. In some implementations of the current subject matter, fixed length representations can be generated for the variable length instructions. For instance, the fixed length representations can be generated by padding or truncating the variable length instructions to a certain fixed length (e.g., 2 bytes, 8 bytes, 15 bytes). Moreover, the fixed length representations of the instructions can be further encoded for more efficient processing by a convolutional neural network. For example, the fixed length representations can be encoded using a sparse (e.g., one-hot encoding) or dense (e.g., binary encoding) encoding scheme.

In some implementations of the current subject matter, a convolutional neural network can be trained to detect malware by applying one or more supervised learning and/or optimization techniques. For instance, training a convolutional neural network can include utilizing the convolutional neural network to process a plurality of training files. The training files can be disassembled binary files with known classifications (e.g., as malicious or benign). The convolutional neural network can be utilized to process the training files and generate corresponding training outputs. Training the convolutional neural network can include applying one or more supervised learning and/or optimization techniques to minimize the error associated with the training outputs (e.g., relative to the known classifications). A trained convolutional neural network can be provided to detect malicious executables by determining classifications of unknown disassembled binary files (e.g., as malicious or benign).

Figure 1:
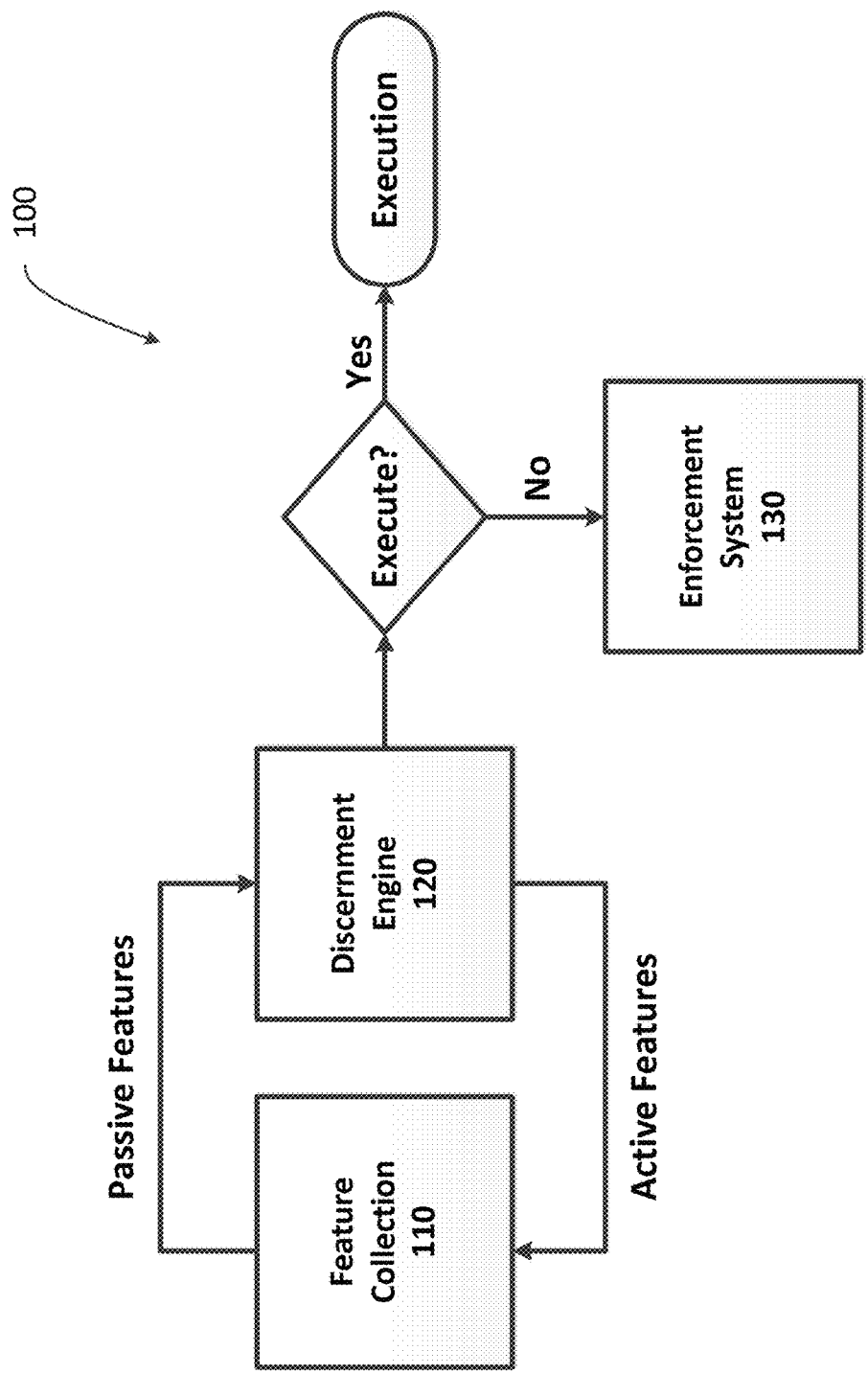
FIG. 1 depicts a block diagram illustrating an example of software elements that can be included in a machine learning model consistent with implementations of the current subject matter.

FIG. 1 depicts a block diagram illustrating an example of software elements that can be included in a machine learning model 100 for use in a discernment application. A feature collection module 110 (sometimes referred to as a feature collector), a discernment module 120, and an enforcement module 130 can interact to learn from one or more samples and to provide predictive outputs regarding the likelihood of a given file being a threat. As used herein, the term "module" refers to software functionality that can be implemented via one or more programmable processors that are part of one or more computing systems. The feature collection module 110 collects or otherwise accesses features characterizing a file and/or the environment in which the file is being, read, downloaded, executed, written to, etc. A feature refers to any salient data point that can be measured from a sample. As used herein, a sample refers to any piece of data upon which classifying or similarity analysis operations against similar samples can be performed. A multiclass classifier refers to a classifier that can support classification in three or more classes. A multi-model classifier refers to a classifier that uses sub models to handle particular intricacies in a complex sample.

A model can be a single or multi-model probability matrix that defines the likelihood of any sample to be classified in a particular class. Consistent with the current subject matter, machine learning models can implemented as both cloud-based instances and locally running instances (e.g. at one or more endpoint computers of an organization).

Features collected and/or accessed by the feature collection module 110 are passed on to the discernment module 120, which can make a decision on whether or not to allow the file to execute (or a file to be downloaded, opened, etc.). If it is determined that the file should not execute or some other action with the file should be prevented, the enforcement module 130 can take action to prevent the file from executing, opening, continuing to execute, writing, being downloaded, etc. In some implementations of the current subject matter, the enforcement module 130 can require quarantining of a file or the like that is assessed as a potential threat.

A machine learning threat discernment model or an ensemble of machine learning threat discernment models can be devised and trained before application control. Due to the predictive nature of various machine learning algorithms, a trained model allows a "fuzzy" match against safe and unsafe programs. As used herein, the terms "safe" and "unsafe" generally refer to a machine-generated, relative classification based on an estimate of the danger presented by one or more files that could be a threat. A machine learning threat discernment model as described herein can output a threat score for a given file, and the threat score can be used to classify the file as safe or unsafe. Other classification protocols with more than two divisions are also within the scope of the current subject matter. In non-limiting examples, threat score outputs from one or more machine learning threat discernment models can be used to classify potential threats in three categories (e.g. safe, suspect, unsafe or similar labels), four categories (e.g. safe, suspect but likely safe, suspect but likely unsafe, and unsafe or similar labels), or more than four categories.

By carefully selecting and training the machine learning threat discernment models in an ensemble of such models, a threat discernment system can act resiliently against change over time, accommodating small and large changes in program behaviors that resemble "safety" or a lack thereof. Machine learning threat discernment models may be characterized by one or more algorithms incorporated therein, which may include, as illustrative examples, neural networks, support vector machines, logistic regression models, Bayesian algorithms, and decision trees. A machine learning threat discernment model can be trained using supervised learning, in which a training set of input samples labeled with the desired output values conditions the model to correctly classify samples that do not occur in the training set, or it may be trained using unsupervised learning, in which an algorithm identifies hidden structure in unlabeled data.

As noted above, machine learning threat discernment models such as those described herein can, in some examples, provide a risk or threat score as an output based on analysis of a given file. This score, and/or a classification based on such a score can be used to determine whether the file should be allowed to proceed without restriction or is instead flagged as a potential threat. For example, referring back again to the diagram 100 of FIG. 1, a feature collector module 110 can send passive features (operational and dynamic) on an ongoing basis to a discernment module 120. The discernment module 120 can request point in time features from the feature collector module 110 at a particular decision point, such as execution of a file (e.g. a program). These point-in-time features can include observations about the computer's state extrinsic to the file or related features from an external source. The discernment module 120 can then decide if a file should execute or if other actions (e.g. opening or downloading a file, transmitting or receiving data, etc.) are allowed to begin or proceed. If execution/opening/downloading is allowed based on the decision of the discernment module about a file, a program executes or a file is opened or downloaded, or other actions related to the file can occur. If an action is disallowed, an enforcement module 130 can prevent it from occurring.

Machine learning approaches can be applied both locally (e.g. at one or more computer endpoints) and via a networked (e.g. cloud-based) service in which suspect files or programs are analyzed by models implemented on one or more servers or other computers. In some implementations, both a local version (e.g. executing on an endpoint machine) of a model and a cloud-based version of the model may handle discernment tasks. The local model can provide endpoint detection that does not rely on the presence of a network connection and that does not require transmission of information about a suspected threat to servers running the cloud-based version of the model. The cloud-based version can be more readily updated with improvements in the machine learning and other features that may lead to better discernment of threats. Additionally, a cloud-based model can learn from inputs received from multiple endpoints and may therefore be better at adapting to new types of threats. As such, a given suspected threat may be analyzed by both a cloud-based version of a machine learning model and a local version of the machine learning model. Because the cloud-based model generally has access to more updated information as well as a greater pool of training inputs, in cases where a cloud-based model and a locally running model disagree, the typical approach is to let the scoring of a file, program, activity, etc. produced by the cloud-based model govern the final score given to the file, program, activity, etc. (which are generically referred to herein as "samples").

Approaches such as convolutional neural networks can yield classifiers that can learn to extract features that are at least as effective as human-engineered features. While such models are currently applied to image and audio data, recent results demonstrate that these approaches may provide previously unappreciated effectiveness with other data types, such as text data. While applying such approaches to the bytes of an executable for the purposes of malware classification can result in some improvement, a limiting factor to the effectiveness of such a model can be the ability to process longer samples. While image data tends to be of a small and fixed size (e.g., 256×256 pixels and 3 color channels), executables exist in a large range of potential file sizes, from several kilobytes to hundreds of megabytes.

In a naive configuration of a machine learning model discernment approach incorporating convolution neural network, the convolutional neural network would generally apply uniform amounts of computation to all regions of an input sample. In executable files, however, there may be large sections of benign code that would not help a classifier to determine whether the file is malicious. For example, a typical approach might include some initial feature engineering, which can include definition of one or more n-grams (e.g. byte sequences). Based on this initial feature engineering, one or more classifiers may be developed to assist a machine learning algorithm.

Figure 2A:
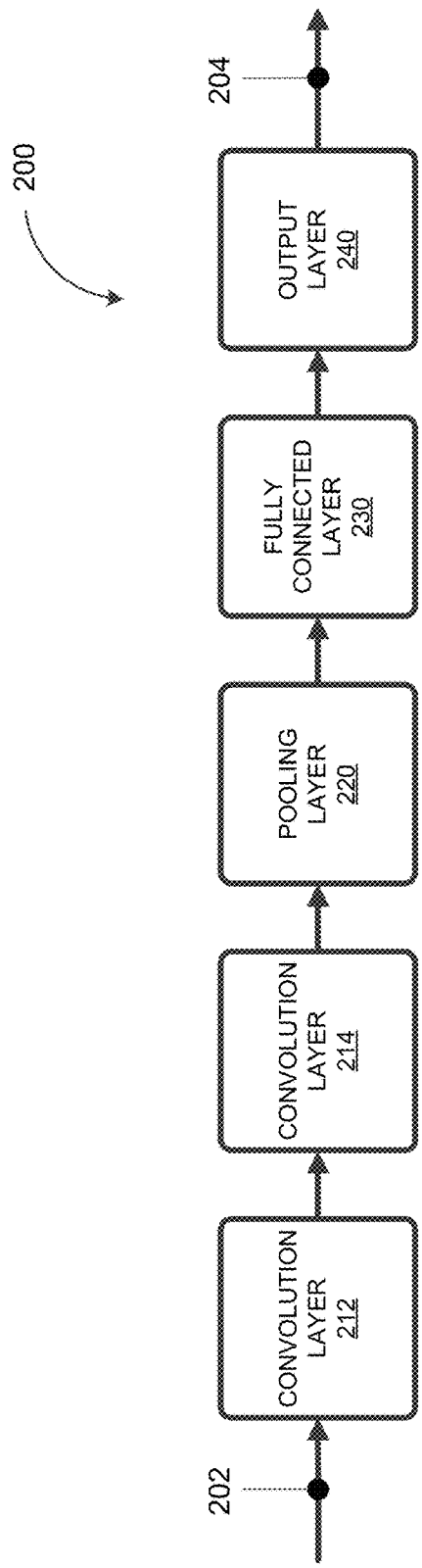
FIG. 2A depicts a convolutional neural network consistent with implementations of the current subject matter.
Figure 2B:
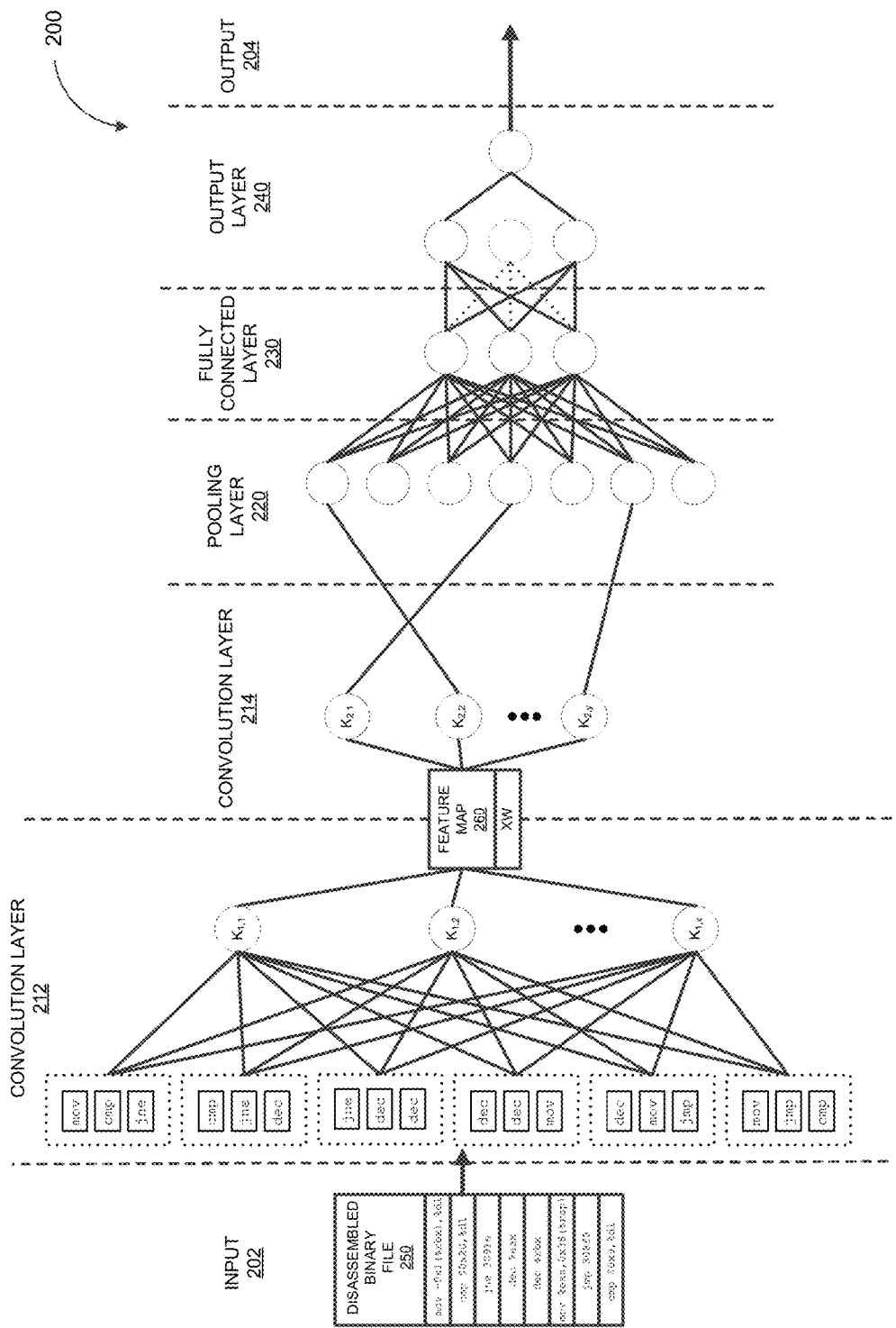
FIG. 2B depicts a convolutional neural network consistent with implementations of the current subject matter.

FIGS. 2A-B depicts a convolutional neural network 200 consistent with implementations of the current subject matter. Referring to FIGS. 2A-B, the convolutional neural network 200 may include a first convolution layer 212, second convolution layer 214, a pooling layer 220, a fully connected layer 230, and an output layer 240. The convolutional neural network 200 can be utilized to detect malware by determining classifications (e.g., as malicious or benign) for one or more disassembled binary files including, for example, a disassembled binary file 250.

The convolutional neural network 200 can be configured to process the disassembled binary file 250, which can include a sequence of instructions that are variable in length. As such, one or more techniques can be applied to generate fixed length representations of the instructions. Moreover, the fixed length representations of the instructions can be encoded to generate a corresponding sequence of encoded fixed length representations. Thus, the convolutional neural network 200 can be configured to receive, at an input 202, a sequence of encoded fixed length representations of instructions from the disassembled binary file 250.

In some implementations of the current subject matter, variable length instructions from the disassembled binary file 250 can be padded to generate fixed length representations of the instructions. For example, each instruction can be padded to a maximum length (e.g., 15 bytes for x86 architecture), thereby avoiding any loss of information. Alternately, variable length instructions can be truncated to generate the fixed length representations of the instructions. For instance, each instruction can be truncated to the most common length of instructions (e.g., 8 bytes).

According to some implementations of the current subject matter, each variable length instruction can be truncated to the first 2 bytes of the instruction. Truncating an instruction to the first 2 bytes of the instruction can retain information that is relevant for malware detection including, for example, instruction mnemonic and types of operands. The remaining portion of the instruction can include information that is not relevant to malware detection including, for example, the operands of the instruction. Thus, truncating to the first 2 bytes of the instructions does not compromise the effectiveness and reliability of the convolutional neural network 200 in detecting malware.

The fixed length representations of the instructions can be encoded to generate a sequence of encoded fixed length representations. In some implementations of the current subject matter, the fixed length representations can be encoded using a dense encoding scheme. For instance, each fixed length representation can be encoded using binary encoding. As such, 8 bits may be required to represent every byte of information in the fixed length representation of an instruction. Alternately, the fixed length representations can be encoded using a sparse encoding scheme. For example, each fixed length representation can be encoded using one-hot encoding. Using one-hot encoding to encode a fixed length representation of an instruction can require 256 bits for every byte of information in the fixed length representation of an instruction. However, a sparse encoding scheme may facilitate optimizations when the convolutional neural network 200 is undergoing training.

For example, FIG. 3A depicts an example of an instruction set 300 that can be included in the disassembled binary file 250. The instructions in the instruction set 300 can be truncated to generate fixed length representations of each instruction. For instance, the instructions can be truncated to preserve the mnemonic associated with each instruction (e.g., mov, cmp, jne, dec, and jmp). Moreover, the fixed length representations can be encoded using a dense or sparse encoding scheme. FIG. 3B depicts an example of the mappings that can be used when one-hot encoding is applied to the instructions in the instruction set 300 to generate encoded fixed length representations of each instruction. Meanwhile, FIG. 3C depicts an example of the encoded fixed length representations of instructions in the instruction set 300. The encoded fixed length representations shown in FIG. 3C may be provided at the input 102 of the convolutional neural network 200.

In some implementations of the current subject matter, the first convolution layer 212 can be configured to process the encoded fixed length representations by applying a plurality of kernels $K_{1,1}, K_{1,2}, \ldots, K_{1,x}$ to the encoded fixed length representations. Each kernel applied at the first convolution layer 212 can be configured to detect a specific sequence of instructions. According to some implementations of the current subject matter, each kernel applied at the first convolution layer 212 can be adapted to detect a sequence having a w number of instructions. That is, the kernels $K_{1,1}, K_{1,2}, \ldots, K_{1,x}$ can be adapted to detect instances where a w number of instructions appear in a certain order. For example, the kernel $K_{1,1}$ can be adapted to detect the instruction sequence [cmp, jne, dec] while the kernel $K_{1,2}$ can be adapted to detect the instruction sequence [dec, mov, jmp]. The size of each kernel (e.g., the w number of instructions) can correspond to a window size of the first convolution layer 212.

In some implementations of the current subject matter, each of the kernels $K_{1,1}, K_{1,2}, \ldots, K_{1,x}$ can be applied to consecutive groups of instructions in the disassembled binary file 250. For instance, after applying the kernel $K_{1,1}$ to a first group of instructions, the kernel $K_{1,1}$ can be slid in accordance to a certain stride size and applied to a second adjacent group of instructions. Thus, if the window size at the first convolution layer 212 is three and the stride size at the first convolution layer 212 is one, the kernels $K_{1,1}, K_{1,2}, \ldots, K_{1,x}$ can be applied to the instructions from the instruction set 300 in an order shown in FIG. 3D.

According to some implementations of the current subject matter, applying the kernels $K_{1,1}, K_{1,2}, \ldots, K_{1,x}$ to the instructions in the disassembled binary file 250 can generate a corresponding feature map 260. The feature map 260 that is generated by applying the kernels $K_{1,1}, K_{1,2}, \ldots, K_{1,x}$ to the instructions from the disassembled binary file 250 can be denoted by the following:

$$XW_1,$$

wherein $W_1 \in R^{N_{out} \times N}$ is a weight matrix representative of the convolutional kernels (e.g., kernels $K_{1,1}, K_{1,2}, \ldots, K_{1,x}$) applied at the first convolution layer 212, and wherein X is an input matrix representative of the instructions, which has been arranged in a processing order specified by the window size and stride size of the first convolution layer 212.

Figures 3E, 3F, 3G:
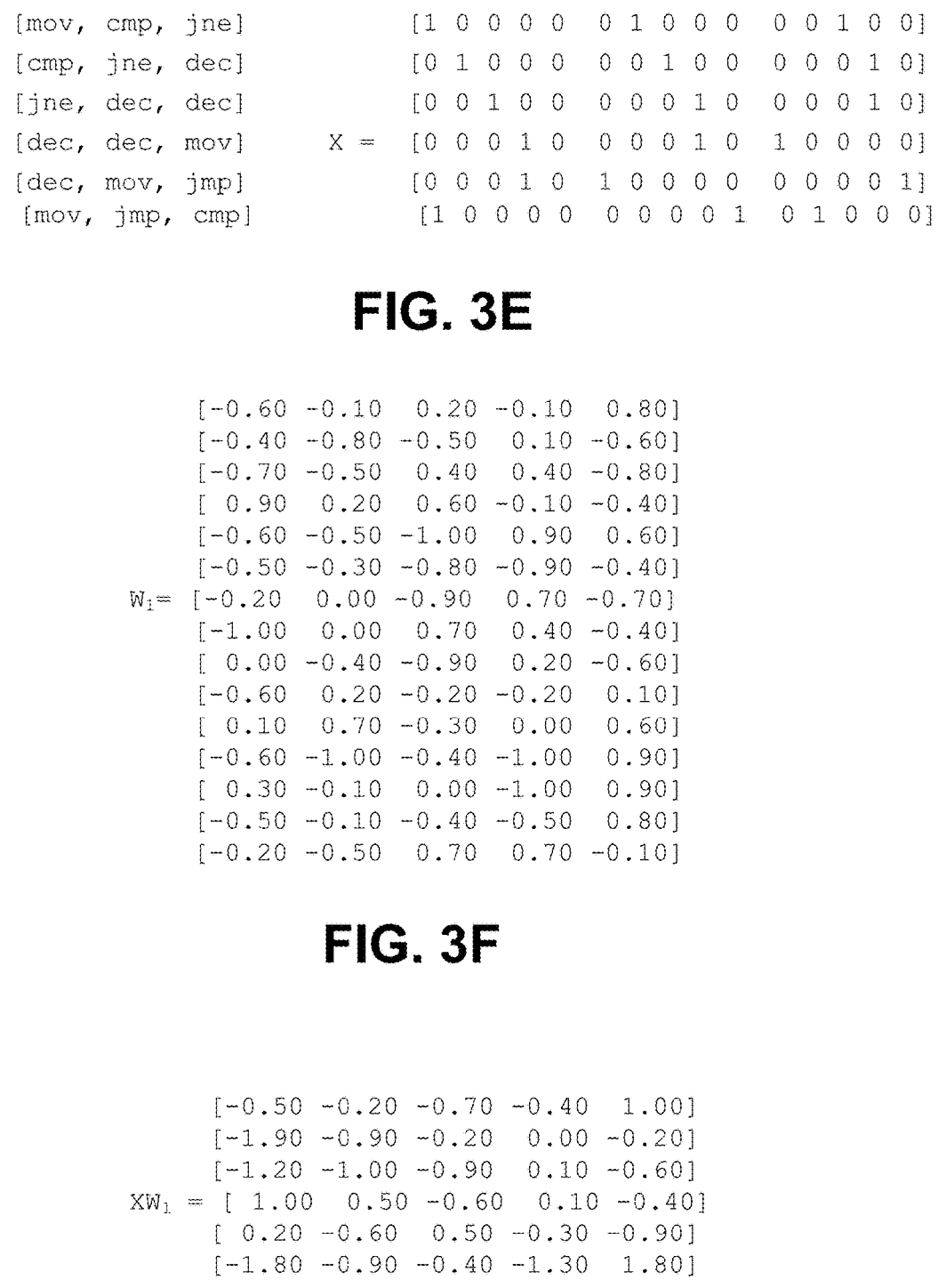

FIG. 3E depicts an example of an input matrix X representative of the sequence of instructions in the disassembled binary file 250. An example of a weight matrix $W_1$ representative of the kernels $K_{1,1}, K_{1,2}, \ldots, K_{1,x}$ that is applied at the first convolution layer 212 is shown in FIG. 3F. FIG. 3G depicts an example of a matrix $XW_1$ representative of the feature map 260 that is generated by applying the kernels $K_{1,1}, K_{1,2}, \ldots, K_{1,x}$ to the instructions from the disassembled binary file 250.

Referring again to FIGS. 2A-B, the second convolution layer 214 can be configured to further process the disassembled binary file 250 by applying a plurality of additional kernels $K_{2,1}, K_{2,2}, \ldots, K_{2,y}$ to the feature map 260 output from the first convolution layer 212. According to some implementations of the current subject matter, each successive convolution layer (e.g., the first convolution layer 212, the second convolution layer 214) can be adapted to generate increasingly abstract representations of the sequence of instructions from the disassembled binary file 250. Thus, the kernels $K_{2,1}, K_{2,2}, \ldots, K_{2,y}$ applied at the second convolution layer 214 can be adapted to detect specific sequences of two or more of the sequences of instructions detected at the first convolution layer 212. That is, the kernels $K_{2,1}, K_{2,2}, \ldots, K_{2,y}$ can be adapted to detect instances where specific sequences of instructions appear in a certain order. For instance, the kernel $K_{2,1}$ can be adapted to detect when the instruction sequence [cmp, jne, dec] is followed immediately by the instruction sequence [dec, mov, jmp]. Applying the $K_{2,1}, K_{2,2}, \ldots, K_{2,y}$ to the feature map 260 can generate an output denoted by the following:

$$[W_1; W_2]X,$$

wherein $W_2 \in R^{N_{out} \times N}$ is a weight matrix representative of the convolutional kernels (e.g., $K_{2,1}, K_{2,2}, \ldots, K_{2,y}$) applied at the second convolution layer 214.

Although the convolutional neural network 200 is shown to include the first convolution layer 212 and the second convolution layer 214, it should be appreciated that the convolutional neural network 200 can include a different number of convolution layers without departing from the scope of the present disclosure. For instance, the convolutional neural network 200 can include fewer or more convolution layers without departing from the scope of the present disclosure.

In some implementations of the current subject matter, the pooling layer 220 can be configured to further process the output from a preceding convolution layer by compressing (e.g., sub-sampling or down sampling) the output from the preceding convolution layer. The pooling layer 220 can compress the output by applying one or more pooling functions including, for example, a maximum pooling function. For example, the pooling layer 220 can be configured to further process the output from the second convolution layer 214 by applying a maximum pooling function adapted to select a maximum output from a set of outputs from a preceding convolution layer (e.g., the second convolution layer 214).

In some implementations of the current subject matter, the output from the pooling layer 220 can be further processed by the fully connected layer 230 and the output layer 240 in order to generate a classification for the disassembled binary file 250 (e.g., as malicious or benign). For example, the output layer 240 can apply an activation function to determine a classification of the disassembled binary file 250 as malicious or benign. The classification of the disassembled binary file 250 can be provided at an output 204 of the convolutional neural network 200.

According to some implementations of the current subject matter, the convolutional neural network 200 can be trained by utilizing the convolutional neural network 200 to process a plurality of training files and generate a corresponding plurality of training outputs. The plurality of training files can be disassembled binary files including, for example, the disassembled binary file 250. Training the convolutional neural network 200 can include applying one or more supervised learning (e.g., backward propagation of errors) and optimization techniques (e.g., gradient descent) to minimize the error (or loss) in the training outputs relative to the correct classifications associated with each training file.

For instance, for each training file, an error (or loss) associated with the corresponding training output (e.g., relative to the correct classification) can be back propagated through the convolutional neural network 200 to generate a loss function. Gradient descent can be performed to determine one or more optimizations to the convolutional neural network 200 including, for example, adjustments to the weights applied at the convolution layers (e.g., the weight matrix $W_1$ applied at the first convolution layer 212 and the weight matrix $W_2$ applied at the second convolution layer 214). The convolutional neural network 200 can be trained by processing multiple training files such that multiple iterations of optimizations (e.g., weight adjustments) are performed in generating a trained convolutional neural network 200.

Figure 4:
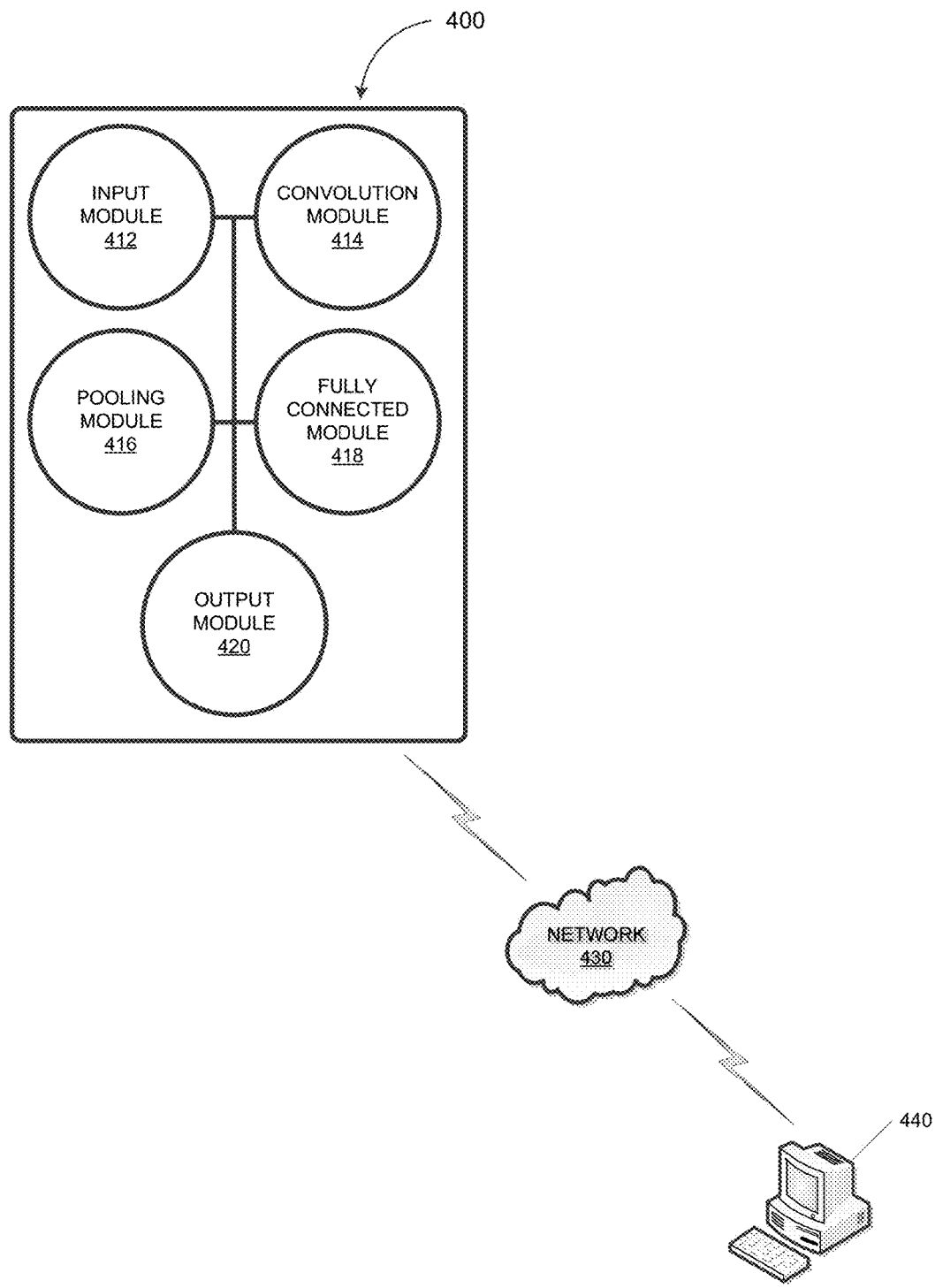
FIG. 4 depicts a block diagram illustrating a neural network system consistent with implementations of the current subject matter.

FIG. 4 depicts a block diagram illustrating a neural network system 400, in accordance with some example embodiments. Referring to FIGS. 2A-4, the convolutional neural network system 400 can implement the convolutional neural network 200.

In some example embodiments, the neural network system 400 may be realized in digital electronic circuitry, integrated circuitry, specially designed application specific integrated circuits (ASICs), field programmable gate arrays (FPGAs) computer hardware, firmware, software, and/or combinations thereof. As shown in FIG. 3, the neural network system 400 can include an input module 412, a convolution module 414, a pooling module 416, a fully connected module 418, and an output module 420. The neural network system 400 may further be communicatively coupled with one or more devices including, for example, a device 440. The neural network system 400 may communicate with the device 440 via a wired and/or wireless network 430 (e.g., a wide area network (WAN), a local area network (LAN), and/or the Internet).

The input module 412 can be configured to receive (e.g., from the device 440) encoded fixed length representations of one or more disassembled binary files (e.g., the disassembled binary file 250). Alternately, in some implementations of the current subject matter, the input module 412 can be configured to receive (e.g., from the device 440) the disassembled binary file 250, which includes a sequence of variable length instructions. The input module 412 can generate encoded fixed length representations of the instructions from the disassembled binary file 250. For instance, the input module 412 can be configured to pad and/or truncate the instructions to generate fixed length representations of each instruction. Furthermore, the input module 412 can apply a dense encoding scheme (e.g., binary encoding) or a sparse encoding scheme (e.g., one-hot encoding) to encode the fixed length representations of the instructions. Converting the instructions from the disassembled binary file 250 to encoded fixed length representations enables further processing of the disassembled binary file 250 by the neural network system 400. It should be appreciated that the input module 412 can receive one or more training files while the convolutional neural network 200 is being trained to detect malware. Alternately or additionally, the input module 412 can receive unknown disassembled binary files and provide classifications of the unknown disassembled binary files (e.g., as malicious or benign).

The convolution module 414 can receive, from the input module 412, encoded fixed length representations of the sequence of instructions from the disassembled binary file 250. In some implementations of the current subject matter, the convolution module 414 can be configured to process the plurality of feature vectors by applying the kernels $K_{1,1}, K_{1,2}, \ldots, K_{1,x}$ to the encoded fixed length representations of the instructions. The application of the kernels $K_{1,1}, K_{1,2}, \ldots, K_{1,x}$ can generate a feature map (e.g., the feature map 260). According to some implementations of the current subject matter, the convolution module 414 can apply additional kernels (e.g., the kernels $K_{2,1}, K_{2,2}, \ldots, K_{2,y}$) to that feature map. The application of the kernels can generate increasingly abstract representations of the instructions from the disassembled binary file 250. For instance, each of the kernels $K_{1,1}, K_{1,2}, \ldots, K_{1,x}$ can be applied to detect a specific sequence of two or more instructions (e.g., two or more instructions that appear in a certain order). Meanwhile, each of the kernels $K_{2,1}, K_{2,2}, \ldots, K_{2,y}$ can be subsequently applied to detect a specific sequence of two or more sequences of instructions (e.g., two or more sequences of instructions that appear in a certain order).

In some example embodiments, the pooling module 416 can be configured to compress (e.g., sub-sample or down sample) the output from the convolution module 414. For instance, the pooling module 416 can apply a maximum pooling function to the output from the convolution module 414 in order to identify the maximum (e.g., salient or significant) feature (e.g., sequence of two or more instructions, sequence of two or more sequences of instructions) in that output. The maximum features identified by the pooling module 416 can be further processed by the fully connected module 418. Meanwhile, output from the fully connected module 418 can be further processed by the output module 420. The output module 420 can be configured to provide an output of the neural network system 400, which may be a classification of the disassembled binary file 150 as malicious or benign. The output module 420 can be configured to provide the output of the neural network system 400 by transmitting the output to the device 440 (e.g., via the network 430).

Figure 5:
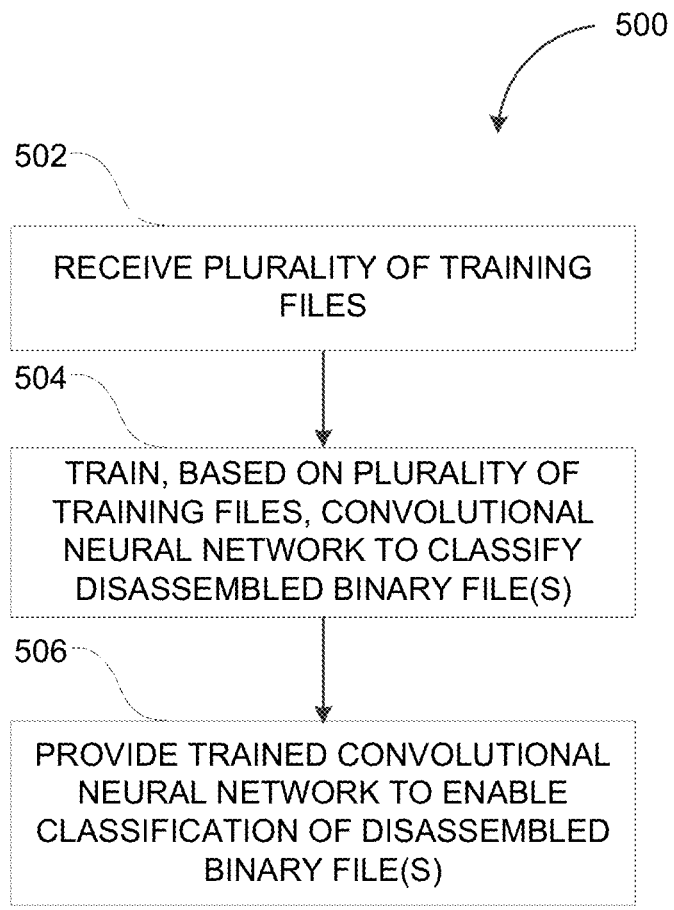
FIG. 5 depicts a flowchart illustrating a process for training a conventional neural network to detect malware consistent with implementations of the current subject matter.

FIG. 5 depicts a flowchart illustrating a process 500 for training a convolutional neural network consistent with some implementations of the current subject matter. Referring to FIGS. 1-5, the process 500 can be performed by the neural network system 400 to train the convolutional neural network 200.

The neural network system 400 can receive a plurality of training files (502). For example, the neural network system 400 can receive a set of training files from the device 340 and/or another source. In some example embodiments, the training files can be disassembled binary files including, for example, the disassembled binary file 250. As such, each training files may include a sequence of instructions.

The neural network system 400 may train, based on the plurality of training files, the convolutional neural network 200 to classify one or more disassembled binary files (504). For example, the neural network system 400 can train the convolutional neural network 200 by utilizing the convolutional neural network 200 to process the training files. In some example embodiments, the convolutional neural network 200 may be adapted to process encoded fixed length representations of the instructions in each training file by applying a plurality of kernels (e.g., the kernels $K_{1,1}$, $K_{1,2}$, ..., $K_{1,x}$, the kernels $K_{2,1}$, $K_{2,2}$, ..., $K_{2,y}$) adapted to generate increasingly abstract representations of the instructions from the training files. For instance, application of some kernels (e.g., the kernels $K_{1,1}$, $K_{1,2}$, ..., $K_{1,x}$) can detect specific sequences of instructions while the subsequent application of other kernels (e.g., $K_{2,1}$, $K_{2,2}$, ..., $K_{2,y}$) can detect instances where certain sequences of instructions that appear in a specific order. The convolutional neural network 200 can process the encoded fixed length representations to generate classifications of the training files.

For each training file, an error associated with the classification of the training file relative to a correct classification of the training script can be back propagated through the convolutional neural network 200 to generate a loss function. Gradient descent can be performed in order to determine one or more optimizations to the convolutional neural network 200 (e.g., e.g., the weight matrix $W_1$ applied at the first convolution layer 212 and the weight matrix $W_2$ applied at the second convolution layer 214) that would minimize the loss function. In some implementations of the current subject matter, training the convolutional neural network 200 can include using the convolutional neural network 200 to process multiple training files. As such, the neural network system 400 may perform multiple iterations of optimizations (e.g., weight and/or bias adjustments) in order to generate a trained convolutional neural network 200 that is able to provide correct classifications for one or more disassembled binary files.

The neural network system 400 can provide the trained convolutional neural network 200 to enable classification of at least one disassembled binary file (506). For example, the trained convolutional neural network 200 may be deployed to process unknown disassembled binary files and to provide a classification of the disassembled binary files (e.g., as malicious or benign). In some implementations of the current subject matter, the trained convolutional neural network 200 can be provided in any manner including, for example, computer software, dedicated circuitry (e.g., ASICs), and/or over a cloud platform.

Figure 6:
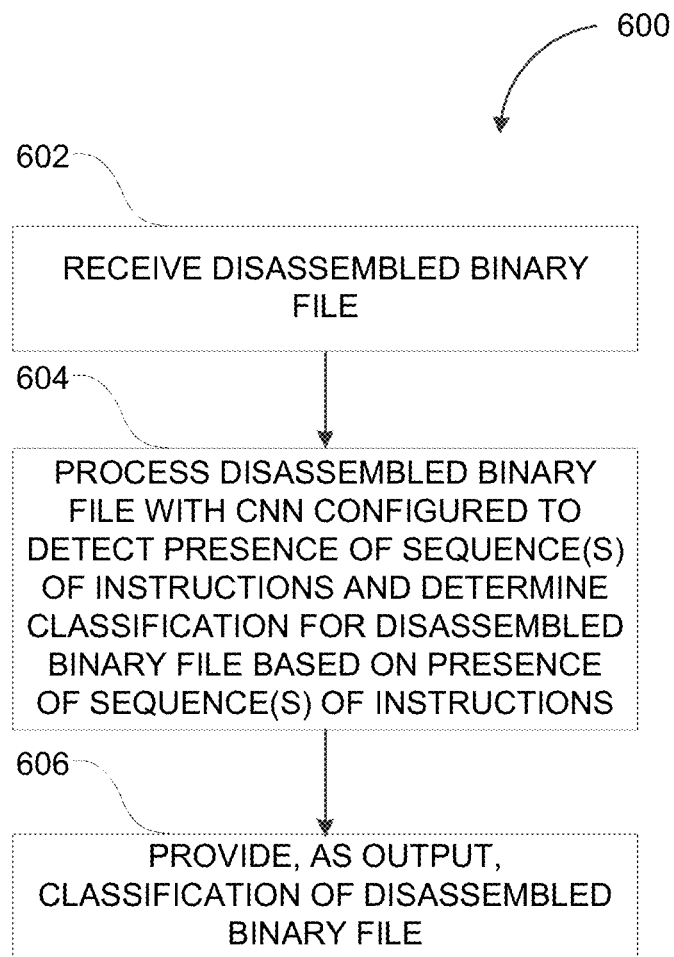
FIG. 6 depicts a flowchart illustrating a process for utilizing a trained convolutional neural network to detect malware consistent with implementations of the current subject matter.

FIG. 6 depicts a flowchart illustrating a process 600 for utilizing the trained convolutional neural network 200 consistent with some implementations of the current subject matter. Referring to FIGS. 1-6, in some example embodiments, the process 600 can be performed by the neural network system 400 to utilize the convolutional neural network 200 subsequent to training.

The neural network system 400 can receive the disassembled binary file 250 (602). For example, the neural network system 400 can receive the disassembled binary file 250 from the device 440 and/or another source. In some example embodiments, the disassembled binary file 250 can include a sequence of instructions.

The neural network system 400 can utilize the trained convolutional neural network 200 to determine a classification for the disassembled binary file 250 (604). For example, the neural network system 400 can utilize the convolutional neural network 200 to process the disassembled binary file 250. In some implementations of the current subject matter, the trained convolutional neural network 200 can be adapted to process the disassembled binary file 250 by applying one or more kernels (e.g., the kernels $K_{1,1}$, $K_{1,2}$, ..., $K_{1,x}$ and/or the kernels $K_{2,1}$, $K_{2,2}$, ..., $K_{2,y}$) to encoded fixed length representations of the instructions in the disassembled binary file 250. The trained convolutional neural network 200 can be configured to apply one or more weights (e.g., the weight matrix $W_1$ and/or $W_2$) that have been optimized (e.g., during training) to minimize an error in the classification of the disassembled binary file 250.

The neural network system 400 can provide, as an output, a classification of the disassembled binary file 250 (606). For example, a result of the processing performed by the trained convolutional neural network 200 can be a classification of the disassembled binary file 250 as malicious or benign. In some example embodiments, the neural network system 400 can provide the output to the device 440 (e.g., via the network 430).

Implementations of the present disclosure can include, but are not limited to, methods consistent with the descriptions provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital Mill image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed is:

1. A system, comprising:
    at least one processor; and at least one memory including program code which when executed by the at least one memory provides operations comprising:
        receiving a disassembled binary file that includes a plurality of instructions;
        generating fixed length representations of the plurality of instructions by truncating each of the plurality of instructions to a same length and to remove portions of the instructions not relevant to malware detection;
        encoding the fixed length representations of the instructions;
        processing the encoded fixed length representations of the instructions with a convolutional neural network configured to detect a presence of one or more sequences of instructions amongst the plurality of instructions and determine a classification for the disassembled binary file based at least in part on the presence of the one or more sequences of instructions; and
        providing, as an output, the classification of the disassembled binary file, the classification being used to determine whether to execute, open, or download the disassembled binary file;

wherein the convolutional network is trained using a plurality of training files having fixed length representations of instructions, the fixed length representations of instructions are applied to a plurality of kernels adapted to generate increasingly abstract representations of such instructions, some of the kernels are configured to detect specific sequences of instructions while subsequent application of other kernels are configured to detect instances where certain sequences of instructions that appear in a specific order.

2. The system of claim 1, wherein the plurality of instructions are variable in length.

3. The system of claim 1, wherein the fixed length representations of the plurality of instructions includes a mnemonic associated with each instruction.

4. The system of claim 1, wherein the encoding is based on one-hot encoding or binary encoding.

5. The system of claim 1, wherein the convolutional neural network is configured to apply a first plurality of kernels to the disassembled binary file, and wherein each of the first plurality of kernels is adapted to detect a different sequence of two or more instructions.

6. The system of claim 5, wherein the convolutional neural network is further configured to apply a second plurality of kernels to the disassembled binary file, and wherein each of the second plurality of kernels is adapted to detect a different sequence of two or more sequences of instructions.

7. The system of claim 5, wherein applying the first plurality of kernels includes applying a first weight matrix to a matrix representation of the disassembled binary file, and wherein the matrix representation of the disassembled binary file comprises encoded fixed length representations of the plurality of instructions included in the disassembled binary file.

8. The system of claim 7, wherein the system is further configured to train the convolutional neural network by at least: receiving a plurality of training files, wherein the plurality of training files comprises a plurality of disassembled binary files; determining a classification of a first training file by at least processing the first training file with the convolutional neural network; back propagating an error associated with the classification of the first training file; and adjusting at least the first weight matrix to minimize the error associated with the classification of the first training file.

9. The system of claim 8, wherein training the convolutional neural network further comprises: determining a classification for a second training file by at least processing the second training file with the convolutional neural network; back propagating an error associated with the classification of the second training file; and readjusting at least the first weight matrix to minimize the error associated with the classification of the second training file.

10. A computer-implemented method, comprising:
receiving a disassembled binary file that includes a plurality of instructions;
generating fixed length representations of the plurality of instructions by truncating each of the plurality of instructions to a same length and to remove portions of the instructions not relevant to malware detection;
encoding the fixed length representations of the instructions;
processing the encoded fixed length representations of the instructions with a convolutional neural network configured to detect a presence of one or more sequences of instructions amongst the plurality of instructions and determine a classification for the disassembled binary file based at least in part on the presence of the one or more sequences of instructions; and
providing, as an output, the classification of the disassembled binary file, the classification being used to determine whether to execute, open, or download the disassembled binary file;
wherein the convolutional network is trained using a plurality of training files having fixed length representations of instructions, the fixed length representations of instructions are applied to a plurality of kernels adapted to generate increasingly abstract representations of such instructions, some of the kernels are configured to detect specific sequences of instructions while subsequent application of other kernels are configured to detect instances where certain sequences of instructions that appear in a specific order.

11. The method of claim 10, wherein the plurality of instructions are variable in length.

12. The method of claim 10, wherein the fixed length representations of the plurality of instructions includes a mnemonic associated with each instruction.

13. The method of claim 10, wherein the encoding is based on one-hot encoding or binary encoding.

14. The method of claim 10, wherein the convolutional neural network is configured to apply a first plurality of kernels to the disassembled binary file, and wherein each of the first plurality of kernels is adapted to detect a different sequence of two or more instructions.

15. The method of claim 14, wherein the convolutional neural network is further configured to apply a second plurality of kernels to the disassembled binary file, and wherein each of the second plurality of kernels is adapted to detect a different sequence of two or more sequences of instructions.

16. The method of claim 14, wherein applying the first plurality of kernels includes applying a first weight matrix to a matrix representation of the disassembled binary file, and wherein the matrix representation of the disassembled binary file comprises encoded fixed length representations of the plurality of instructions included in the disassembled binary file.

17. The method of claim 16, further comprising training the convolutional neural network by at least: receiving a plurality of training files, wherein the plurality of training files comprises a plurality of disassembled binary files; determining a classification of a first training file by at least processing the first training file with the convolutional neural network; back propagating an error associated with the classification of the first training file; and adjusting at least the first weight matrix to minimize the error associated with the classification of the first training file.

18. The method of claim 17, wherein training the convolutional neural network further comprises: determining a classification for a second training file by at least processing the second training file with the convolutional neural network; back propagating an error associated with the classification of the second training file; and readjusting at least the first weight matrix to minimize the error associated with the classification of the second training file.

19. A non-transitory computer program product storing instructions which, when executed by at least one computing device, result in operations comprising:
receiving a disassembled binary file that includes a plurality of instructions;
generating fixed length representations of the plurality of instructions by truncating each of the plurality of instructions to a same length and to remove portions of the instructions not relevant to malware detection;

encoding the fixed length representations of the instructions;

processing the encoded fixed length representations of the instructions with a convolutional neural network configured to detect a presence of one or more sequences of instructions amongst the plurality of instructions and determine a classification for the disassembled binary file based at least in part on the presence of the one or more sequences of instructions; and providing, as an output, the classification of the disassembled binary file, the classification being used to determine whether to execute, open, or download the disassembled binary file;

wherein the convolutional network is trained using a plurality of training files having fixed length representations of instructions, the fixed length representations of instructions are applied to a plurality of kernels adapted to generate increasingly abstract representations of such instructions, some of the kernels are configured to detect specific sequences of instructions while subsequent application of other kernels are configured to detect instances where certain sequences of instructions that appear in a specific order.

* * * * *